United States Patent Office 2,871,190
Patented Jan. 27, 1959

2,871,190

OIL DISPERSIBLE PHYTATES AND COMPOSITIONS THEREOF

Claude Malcolm Finlayson, Coolspring Township, Mercer County, Pa., and John W. Jordan, Harris County, Tex., assignors to National Lead Company, New York, N. Y., a corporation of New Jersey No Drawing. Application January 28, 1953
Serial No. 333,814

4 Claims. (Cl. 252—32.5)

This invention relates to novel gelling and thickening agents for organic and oleaginous systems, and more particularly to a class of oil-dispersible phytic acid compounds which we have discovered and found adaptable for such use.

In many industrial fields, particularly those involving chemical technology, it is desirable to increase the consistency, gelatinize, thicken, or in general to increase the shear strength of systems including an organic liquid or semi-solid. Examples of such an effect are the thickening of lubricating oil to make greases; the thickening of paints to prevent settling and impart proper thixotropic character; the thickening of putties to increase workability and prevent bleeding of oil; the addition of materials to printing inks which add gel strength, plasticity, and in some cases modify tack; the thickening of adhesives where an organic solvent is present, to prevent differential settling and retention on surfaces; the treatment of waxes to increase tensile strength and softening temperature; and many others. Diverse methods have been employed to achieve these needs, depending upon the system involved. In some cases, heat treatment or oxidative treatment of the system itself suffices as when drying oils are heat-treated, or when still residues are air-blown for the production of asphalts; but more commonly a material is added to the system which while in general not soluble therein, nevertheless, will disperse to give the desired thickening and gelling effects. Such materials have been metal salts, particularly heavy metal salts of fatty acids, naphthenic acids, rosin acids, and the like, finely dispersed minerals, particularly of an amorphous or fibriform character, and others.

One of the objects of this invention is to provide a new class of materials for thickening organic systems such as have been described.

Another object of the invention is to provide new derivatives of phytic acid.

Another object is to provide a thickening agent for organic systems of unique and desirable properties.

Other objects of the invention will become apparent as the description thereof proceeds.

In accordance with the invention, a compound is prepared from phytic acid or a suitable derivative of phytic acid, such as one of its alkali-metal salts, and an organic base of such a character, and in such a fashion and to such an extent as to result in the production of a compound having the desired properties. More specifically, a compound is formed in the nature of a salt, in its broadest meaning, in which the anionic portion is essentially the phytic acid anion, and in which the cationic portion comprises substantially an organic cation or cations having a hydrophobic group, and in which there is a sufficient preponderance of hydrophobic groups over phytic acid molecules to impart over-all hydrophobic and oil-swelling properties to the compound produced.

Phytic acid is inositol hexaphosphoric acid, and is most readily derived from a widely occurring constituent of plants known as phytin, although we mean to include herein phytic acid whether produced synthetically or derived from natural sources. Inositol is hexahydroxycyclohexane, and phytic acid may be looked upon as derived therefrom by an esterification of each hydroxyl group with the phosphoric acid molecule, so that a phytic acid molecule presents twelve phosphoric acid OH groups, two attached to each phosphorus atom. It is a dodecabasic acid, although it appears that six of the acid groups are considerably stronger than the other six, as would be expected by analogy with phorphoric acid itself. It occurs widely in nature as a mixed calcium-magnesium salt, which is derived on a commercial scale from corn steep liquor. It may also conveniently be obtained in the processinng of potatoes. Conversion of phytin to sodium phytate or phytic acid is relatively simple, being effected by metathesis, and will not be described in detail as it is adequately treated in chemical literature. Sodium phytate is a commercial product obtainable at least on a pilot plant scale from corn starch manufacturers employing the wet method of milling. Phytic acid has the forumla $C_6H_{18}O_{24}P_6$.

The cationic organic compounds which we couple with phytic acid to produce the compounds desired are such as have a basic group of substantial base strength, such as an ammonium group, a phosphonium, oxonium, telluronium, stibonium, arsonium, sulphonium, or the like group, and have in addition a group which is specifically hydrophobic. Such a group may, for example, be a straight hydrocarbon chain of about 10 carbon atoms or more, or it may consist of a ring structure of sufficient extent to be hydrophobic, such as for example two cyclohexane rings joined through an ethyl linkage. The criteria which have been developed in connection with hydrophobic-hydrophilic character in the wetting agent art can be adapted for use here; for example, in general, a branched hydrocarbon chain needs to have a somewhat larger number of carbon atoms in order to match the hydrophobicity of a given straight-chain hydrocarbon. Double bonds detract slightly from hydrophobic character but may be made up for by an increase in size. Ring compounds again are not as hydrophobic as corresponding straight-chain compounds, and unsaturated rings even less so, but here again, increase in size will offset these effects so that a suitably hydrophobic group may be obtained. Thus, for example, abietic acid is large enough that it is suitably hydrophobic in spite of lacking a long hydrocarbon chain. Again organic cations with hydrophobic groups near the lower limit of adequate hydrophobicity can be used in greater proportions relative to the phytic acid in the compounds of the present invention, whereas organic cations of very great hydrophobicity need be used in lesser proportions. However, organic cations containing only groups of feeble hydrophobicity, such as for example a hexyl radical or a tolyl radical, will not suffice by themselves no matter how many may be reacted per phytic acid molecule, as mere increase of number will scarcely overcome an inherent lack of substantial hydrophobic character.

The organic cation containing a suitable hydrophobic group or groups as described above is reacted with the phytic acid radical in such proportion that a compound is formed which is water repellent and will disperse in an organic liquid, such as for example toluene or nitrobenzene, to give a system of marked structural viscosity. We have found that a suitable test for over-all effectiveness is to drop two grams of the dry powdered compound, bit by bit, into an excess of nitrobenzene, for example, in a 100 cc. stoppered graduated cylinder. After standing 24 hours, the swollen volume of the sediment is determined. Where a suitably hydrophobic organic cation has been used, and sufficient has been reacted with the phytic acid, then we find that a gel volume of a minimum of about 10 cc. results. The volume may be as high as 40 or 50 cc., and the more highly swelling products are the most useful. Organic cations of various kinds have been previously reacted with phytic acid, but the compounds produced have not had the marked oil-swelling property possessed by the compounds of this invention.

The compounds of the invention are produced most readily by bringing together an aqueous solution of a sodium salt of phytic acid and an aqueous solution of a simple salt, such as the hydrochloride, acetate, hydrobromide, or the like, of the organic cation, all in predetermined proportions. A reaction takes place followed by a precipitation of the compound, which can then be recovered by filtration, decantation, and the like. The compounds obtained are generally dried at a low heat, and ground to a suitable fineness, usually minus 200 mesh.

In place of using an alkali-metal salt of phytic acid, phytic acid itself may be employed, and reacted with the organic cation in its base form. Thus, for example, phytic acid may be dissolved in a sufficient quantity of a 50–50° mixture of acetone and water, and a like solution of the organic base, which might be for example, laurylamine, is added, whereupon most of the compound produced precipitates out and may be recovered. In general, it is necessary to react only six of the available acid groups of each phytic acid molecule, provided that the organic base is sufficiently hydrophobic. Thus, for example, octadecylammonium acetate forms a suitable compound in these proportions with sodium phytate. However, even better results for some purposes are produced by reacting more than six, and even up to twelve of the acid groups with the organic cation. In some cases it will be found advantageous to carry out the reaction at an alkaline pH in order to have ionization of all of the acid groups, and in such a case the use of quaternary ammonium bases or their analogues, such as the phosphonium salts, will be found advantageous because their ionization is not suppressed to as great an extent by an increase in pH as for example the simple amines, such as the primary, secondary and tertiary. The acid groups of the phytate molecule which have not been reached with the organic base or bases may be left in the acid, i. e., hydrogen form, or may be neutralized to an alkali metal (or ammonium) salt such as sodium or potassium, or alkaline earth salt, or with another organic base such as methylamine.

Suitable organic materials which can be used are decylammonium chloride, dilaurylammonium acetate, dimethyldioctadecylammonium bromide, tritetradecylammonium acetate, abietylamine (commercially available in crude form as "rosin amine"), α-dimethyl-α-dimethylbutylphenoxyethoxy - ethyldimethylammonium acetate, triphenyllaurylphosphonium bromide, p-nonylbenzylammonium chloride, and others. Polybasic materials such as 1,3-diamino-2,4-dilauryl butane may also be used. It will be understood that while some of the above organic compounds have been specified in their salt forms, this has been done for convenience, and other suitable salts of the organic base may be used, or the base itself, in many cases.

Some examples of the preparation of suitable compounds will now be given.

EXAMPLE 1

Forty-four and four-tenths grams of laurylamine are converted to the acetate with acetic acid and added to a water solution of twenty-one and two-tenths grams of sodium phytate containing 11.5% moisture. The reaction product is relatively insoluble in water and precipitates from the solution. When dried on a steam-heated drum dryer, it is a relatively friable white waxy solid.

EXAMPLE 2

Eighty-three grams of 75% dimethyllaurylcetylammonium bromide in isopropanol are diluted with water and added to a water solution of ten and six-tenths grams of sodium phytate containing 11.5% moisture. The reaction product precipitates from the water solution and dries to a translucent light brown material of vaseline-like consistency.

EXAMPLE 3

Sixty-one and three-tenths grams of triphenyllaurylphosphonium bromide are added to a water solution of ten and six-tenths grams of sodium phytate containing 11.5% moisture. The reaction product precipitates from the water solution, and is air dried to a semi-solid material.

Some examples of the use of the compounds so produced in useful organic systems are given below:

*Example A*

Twenty grams of the compound of Example 1 hereinabove was milled on a three-roll mill with one hundred and eighty grams of coastal bright stock oil having an SUS viscosity of 1100 sec. at 100° F.; a smooth translucent grease having an unworked ASTM penetration of 395 was obtained. This grease was essentially non-melting, as it exhibited no apparent dropping point. It was likewise resistant to the action of water.

*Example B*

Ten grams of the compound of Example 1 above was dissolved in one hundred grams of a liquid comprising equal parts by weight of toluene and ligroin. This solution, when spread out over a sheet metal surface, dried to a smooth continuous film which was water repellent and flexible.

*Example C*

A solution of a thermosetting phenol-formaldehyde coating resin in methyl ethyl ketone was formulated to include 40% resin solids and 12% of the product of Example 2 above; the phytic compound dissolved readily in the resin solution. When applied to a sheet steel surface and cured at 130° C. for 3 hours it was noted that the phytic reaction product had imparted a desirable plasticizing action to the resin.

In addition to the specific examples of the utilization of the compounds of this invention which have been given above, these compounds may be used whenever thickening, stabilization, gelatinization, increasing tensile strength, and the like is desired in a system having as its basis an organic liquid or semi-solid or mixtures thereof. The compounds of the invention, for example those described in Example 1, 2 or 3, may be used in the following ways among others: Approximately five pounds thereof per thousand pounds of exterior primer paint, exterior house paints, sash and trim paints, interior house paints, enamels, interior flat paints and the like, of the usual linseed oil-pigment-mineral thinner formulation; six to ten pounds per thousand pounds of asphalt paint of the gilsonite-linseed oil-mineral thinner type; five to six pounds per thousand pounds of ordinary spar varnish; and any paints, lacquers, varnishes and stains generally in approximately the proportions noted; one to three pounds per thousand pounds of glazier's putty of the ordinary type consisting of whiting and linseed oil; six to eight pounds per hundred pounds of paint and varnish removers of the mixed solvent type containing chlorinated hydrocarbons, lower aliphatic alcohols and the like; one to five pounds per hundred pounds of printing inks generally, for example of the ordinary newsprint type consisting of mineral oil, rosin and carbon black, as well as typographic inks of the usual formulations; one-half to two pounds per hundred pounds of plastisols and organosols; one to ten percent by weight of waxes, such as paraffin wax, beeswax, ozocerite and the like; small percentages in hydraulic fluids, drawing compounds, fiber lubricants, emulsions of all types, and the like. In some of the above usages, mere addition of the compound of the invention to the system followed by agitation will suffice for proper dispersion, while in other systems, milling or grinding will be necessary, occasionally at elevated temperatures, particularly when normally solid organic systems are in question, such as asphalts and waxes.

Having described the invention, what we claim is:

1. A compound of the formula $$C_6H_6O_{24}P_6Z_{12-n}R_n$$

where $C_6H_6O_{24}P_6$ is the phytate radical, Z is a cation chosen from the group consisting of hydrogen ion, ammonium ion, and alkali metal ions, $n$ varies from 6 to 12 inclusive, and R is an organic onium cation containing a hydrocarbon chain of at least 10 carbon atoms in length.

2. A compound of the formula $$C_6H_6O_{24}P_6Z_{12-n}R_n$$

where $C_6H_6O_{24}P_6$ is the phytate radical, Z is a cation chosen from the group consisting of hydrogen ion, ammonium ion, and alkali metal ions, $n$ varies from 6 to 12 inclusive, and R is an organic onium cation containing a hydrocarbon chain of at least 10 carbon atoms in length, said compound possessing a gelling character in nitrobenzene whereby two grams of said compound swells to at least 10 cc. in nitrobenzene.

3. A compound of the formula $$C_6H_6O_{24}P_6Z_{12-n}R_n$$

where $C_6H_6O_{24}P_6$ is the phytate radical, Z is a cation chosen from the group consisting of hydrogen ion, ammonium ion, and alkali metal ions, $n$ varies from 6 to 12 inclusive, and R is an organic ammonium cation containing a hydrocarbon chain of at least 10 carbon atoms in length.

4. A composition of the class consisting of lubricants, waxes, asphalts, tars, paints, varnishes, lacquers, putties, mastics, hydraulic fluids, solvents, printing inks, elastomers, adhesives, and emulsions and having a continuous phase consisting of an at least semiliquid, oleophilic, organic substance, characterized by the fact that it contains a sufficient quantity of a compound of the formula $$C_6H_6O_{24}P_6Z_{12-n}R_n$$

where $C_6H_6O_{24}P_6$ is the phytate radical, Z is a cation chosen from the group consisting of hydrogen ion, ammonium ion, and alkali metal ions, $n$ varies from 6 to 12 inclusive, and R is an organic onium cation containing a hydrocarbon chain of at least 10 carbon atoms in length, to cause a substantial increase in consistency of said composition.

References Cited in the file of this patent

UNITED STATES PATENTS 2,268,556     Adams et al. _____ Jan. 6, 1942

OTHER REFERENCES

Otolski: Chem. Abs., vol. 28, p. 2337 (1934).
Chem. Abs., vol. 32, p. 4542 (1938).